W. B. GORR.
GOVERNOR.
APPLICATION FILED DEC. 29, 1917. RENEWED OCT. 28, 1918.

1,287,293.

Patented Dec. 10, 1918.

WITNESSES
Paul H. Miller
R. C. Sterns

INVENTOR.
W. B. Gorr.
BY Geo. E. Tew
ATTORNEY.

ated Dec. 10, 1918.

UNITED STATES PATENT OFFICE.

WALTER B. GORR, OF ERIE, PENNSYLVANIA, ASSIGNOR TO SKINNER ENGINE COMPANY, OF ERIE, PENNSYLVANIA, A CORPORATION.

GOVERNOR.

1,287,293.

Specification of Letters Patent. Patented Dec. 10, 1918.

Application filed December 29, 1917, Serial No. 209,426. Renewed October 28, 1918. Serial No. 260,070.

*To all whom it may concern:*

Be it known that I, WALTER B. GORR, a citizen of the United States, residing at Erie, in the county of Erie and State of Penna., have invented certain new and useful Improvements in Governors, of which the following is a specification.

This invention is an improvement in shaft governors for steam or internal combustion engines. Shaft governors heretofore designed will keep the speed constant within certain limits, but do not allow any speed variation beyond those limits without shutting the engine down and changing the tension of the spring or the amount of weights in the governor mechanism, and only within comparatively small limits by this means. Speed-change devices have been used in connection with engines not having automatic governors, whereby the engine speed has been changed by a throttling governor or by lengthening or shortening the valve travel by what is known as hand-adjustable cut-offs. The former method is not economical, and the latter is complicated as well as dangerous to operate.

Heretofore with shaft governors the governor arm had a position in the governor wheel somewhere between what is known as the long-travel and the short-travel positions, depending on the load on the engine. When the engine was starting or stopping, and was not up to full speed, the governor was in what is known as the long-travel position; and when it was operating with nothing but friction load, it was in what is known as the short-travel position. In other words, the governor mechanism operated an eccentric which allowed a variation in the admission valve gear travel.

With my invention the speed of the engine may be changed while it is in operation, and any desired speed from maximum to zero may be obtained in the manner hereinafter shown. Furthermore, with my device the automatic governor is always in position to act as a safety stop and prevent the engine from exceeding a certain predetermined speed, should the load be reduced.

Figure 1:
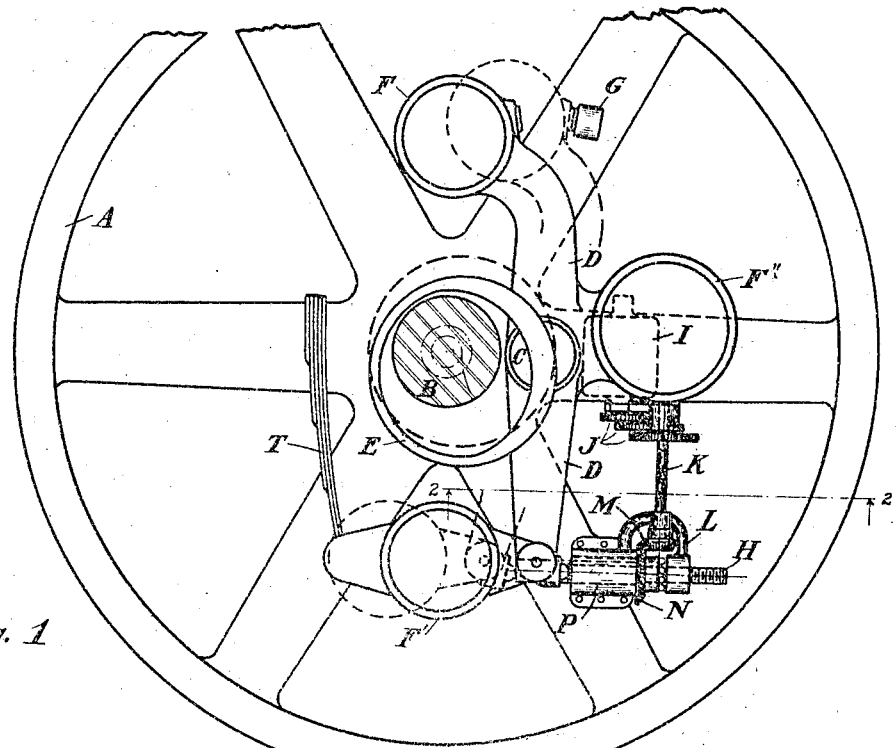
Figure 1 is a side elevation of the governor.
Figure 2:
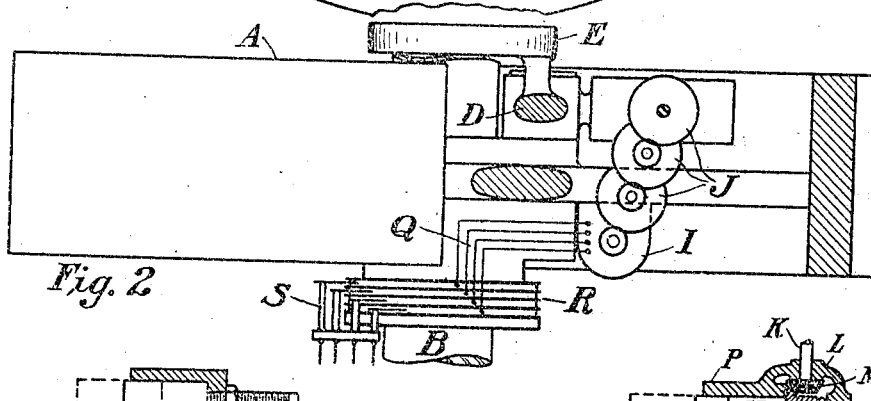
Fig. 2 is a section of the line 2—2 of Fig. 1.
Figure 3:
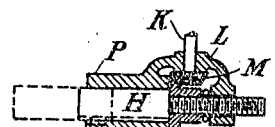
Fig. 3 is a detail in section.

In Figs. 1, 2 and 3, A is the governor wheel of a shaft governor, and B is the shaft supporting the wheel. C is a suspension pin secured to the governor wheel A, on which is pivoted the governor arm D to which is rigidly secured the eccentric E. F and F' are the usual governor weights which, at a certain predetermined speed, maintain the governor arm D in equilibrium with a spring T which is attached to governor wheel A in a known manner (not shown). F'' is another governor weight attached to the governor arm D to balance the eccentric E in the usual manner.

The eccentric E will be connected to and operate the admission valve gear by means of the usual eccentric strap, eccentric rod, etc. I do not limit myself to an eccentric and eccentric strap as shown, but may also use the eccentric pin comomnly used on governors of center crank engines.

G is the least-travel stop; and when governor arm D is in position shown by dotted lines, the center of the eccentric is nearest to the center of the shaft and then the eccentric E will operate the valve gear at its least possible travel. The governor arm D will be in position shown in dotted lines only when the engine is operating at full speed with no load except its own friction.

The stop pin H in the position shown in Figs. 1 and 3 has the same function as the long-travel stop in the usual shaft governor. In existing shaft governors, however, the long-travel stop has been stationary and could not be changed without shutting the engine down; whereas in my device the long-travel may be adjusted while the engine is in operation. This adjustment will change the speed of the engine in the manner hereinafter set forth.

In place of the usual stationary long-travel stop, I provide a mechanism which will adjust the stop to any position desired. This mechanism includes an electric motor I rigidly attached to the governor wheel, preferably on one of the spokes. The armature shaft of the motor I is connected through a train of reduction gearing J to shaft K which, as shown, has one bearing mounted on a governor wheel spoke and the other mounted on the yoke L attached to the governor wheel as shown. On the end of shaft K is mounted a bevel gear M which meshes with a bevel gear N, the hub of which is internally threaded to fit a thread on the stem of the stop pin H. Bevel gear N is held between shoulders forming part of the yoke L so as to prevent any movement parallel to the axis of stop H. A spline O is provided to prevent the long-travel stop pin H from turning in its guide P, which supports the yoke L and is fixed to the wheel.

From the above it will be seen that if the armature of motor I through the train of gearing J, shaft K and bevel gears N and M, causes gear N to rotate in the proper direction, the long-travel stop H will be forced out of its housing P, whereby the long travel of the governor mechanism is reduced. In like manner, by opposite rotation of the bevel gear N, long-travel stop H will be withdrawn into housing P and will lengthen the long travel of the governor mechanism.

To permit the operation of the armature of motor I in either direction of rotation while the governor wheel is revolving, I provide electrical connections Q connecting the motor I to collector rings R mounted on the hub of the governor wheel or on shaft B, as desired. Electric current is supplied to collector rings R through brushes S, current being supplied from any desired source.

When the engine is in operation, the long-travel H will naturally be in position shown by full lines, in which position the governor mechanism controls the speed of the engine irrespective of the load, as is usual in such forms of governors.

Should it be desired to reduce the speed, an electric circuit is established which operates the armature of motor I in such direction of rotation as will cause stop H to be forced out of housing P, and when stop H comes in contact with governor arm D it will force arm D toward the position shown by dotted lines if the armature of the motor continues to force stop H out of housing P. By forcing governor arm D toward the position shown by dotted lines, the center of eccentric E is brought nearer the center of rotation, thus shortening the travel of the admission valve gear connected to eccentric E. The shortening of the travel of the admission valve gear lessens the amount of motive force admitted to the cylinder of the engine at a given load, and the speed of the engine is thereby reduced. The speed may be reduced to a desired point whereupon the electric connection is broken and the armature of motor ceases to revolve. If it is desired to increase the speed of the engine, connection with motor I is made so as to revolve the armature in reverse direction, which will pull stop H into housing P. Governor arm D will follow stop H on account of the tension of governor spring T, thereby increasing the valve travel until the desired speed is reached.

If the stop H is withdrawn into housing P so far that the valve travel is great enough to overcome the load of the engine so as to operate the engine at its maximum speed, the governor arm D will no longer bear against stop H but will have its usual equilibrium with respect to spring T.

When operating this mechanism at reduced speed, that is, speed less than that for which the governor mechanism is adjusted, if the load should be reduced the speed of the engine would not exceed that for which the governor mechanism had been adjusted, for the reason that the governor arm will automatically take a position toward the dotted lines or short travel position which will lessen the travel of the valve gear.

From the above it will be seen that the speed of the engine may be reduced from the normal speed for which the shaft governor is adjusted, and that the speed of the engine may be varied within the limits of zero and maximum speed. It will also be seen that this speed control is obtained by merely lengthening or shortening the long travel position of the governor.

I do not limit myself to operate this long-travel stop by means of an electric motor, but can operate it by fluid motor or mechanical means where the power is obtained from the engine itself or where power is obtained from means outside of engine, either manual or mechanical.

Figure 4:
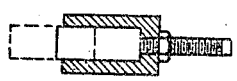
Fig. 4 is a detail of a modification.

Neither do I limit myself to obtaining this adjustment while the engine is in operation. I can obtain the adjustment by shutting down the engine and adjusting the stop H manually, as shown in Fig. 4.

Furthermore, I do not limit myself to placing this device in the usual position as shown of the long-travel stop; but it may be located to function at any suitable point on the governor parts or an extension thereof, to produce similar results.

I claim:

1. In a governor, the combination of a wheel or other rotary member, a governing member movable thereon, an adjustable stop pin carried by the wheel for said member, to limit its movement in one direction, and means carried by the wheel to adjust said stop pin while the wheel is running.

2. In a governor, the combination of a wheel or other rotary member, a governor arm pivoted to the wheel, an adjustable longitudinally-slidable stop on the wheel, to limit the movement of said arm, and means to adjust the stop including a motor mounted on the wheel and operatively connected to the stop.

In testimony whereof, I affix my signature in presence of two witnesses.

WALTER B. GORR.

Witnesses:
　ALBERT E. ROSE,
　GEO. E. TEW.